Figure 1:
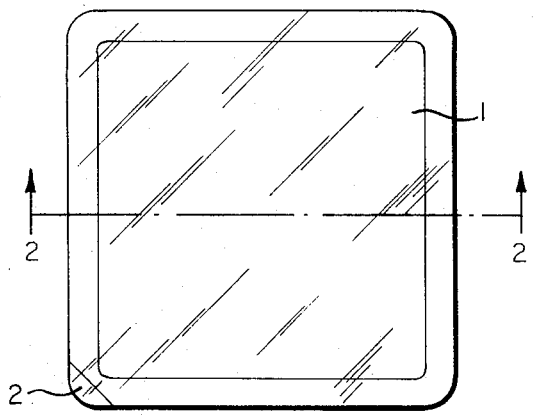
Figure 2:
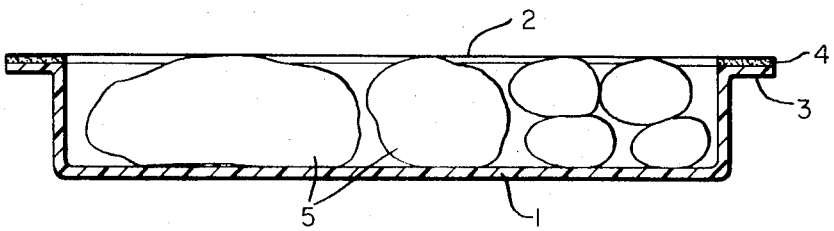

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 9, 1973

915 O.G. 383

T915,001

FORMING POLYETHYLENE TEREPHTHALATE

David Harris Berkebile and Kenneth Leith Knox, Circleville, Ohio, assignors to E. I. du Pont de Nemours and Company, Wilmington, Del.

Continuation of abandoned application Ser. No. 81,312, Oct. 16, 1970. This application July 10, 1972, Ser. No. 269,948

Int. Cl. B29c *17/04, 25/00*

U.S. Cl. 264—89

1 Sheet Drawing. 8 Pages Specification

A process for forming a sheet of polyethylene terephthalate into a mold configuration, the process comprising (a) heating a sheet of polyethylene terephthalate having an intrinsic viscosity of about from 0.50 to 0.59 and a degree of crystallization of about from 0 to 25% to a temperature of about from 75° to 180° C.;

(b) forcing the heated sheet onto a mold surface; and (c) heat setting the shaped sheet at a temperature of about from 125° to 220° C. and for a period of time sufficient to increase the degree of crystallization of the formed article to about from 25 to 60%.

Particularly useful articles that can be formed by the process include trays having a bottom panel, side walls connected to the bottom panel and a continuous outwardly extending flange connected to the upper edges of the side walls; these trays can be used for food containers, which are heatable in either conventional or microwave ovens and are strong and dimensionally stable at temperatures up to about 460° F. Adhesive can be applied to the upper surfaces of the flange to permit the application of a cover film to the tray.

FORMING POLYETHYLENE TEREPHTHALATE

Original Filed Oct. 16, 1970

INVENTORS
DAVID H. BERKEBILE
KENNETH L. KNOX
BY
ATTORNEY